United States Patent
Dutta (10) Patent No.: US 6,718,369 B1
(45) Date of Patent: Apr. 6, 2004

(54) METHOD, SYSTEM AND PROGRAM FOR EFFICIENTLY DISTRIBUTING SERIAL ELECTRONIC PUBLICATIONS

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/542,059

(22) Filed: Apr. 3, 2000

(51) Int. Cl.[7] .............................................. G06F 15/16
(52) U.S. Cl. ...................................... 709/206; 709/207
(58) Field of Search ................................. 709/206, 240, 709/207

(56) References Cited

U.S. PATENT DOCUMENTS

| | | | |
|---|---|---|---|
| 4,745,559 A | | 5/1988 | Willis et al. |
| 5,255,364 A | | 10/1993 | Hirose |
| 5,377,354 A | | 12/1994 | Scannell et al. |
| 5,768,528 A | | 6/1998 | Stumm |
| 5,790,790 A | | 8/1998 | Smith et al. |
| 5,862,176 A | | 1/1999 | Midorikawa et al. |
| 5,862,325 A | | 1/1999 | Reed et al. |
| 5,864,684 A | * | 1/1999 | Nielsen ..................... 709/206 |
| 6,411,393 B1 | * | 6/2002 | Wakasugi .................. 709/206 |

FOREIGN PATENT DOCUMENTS

JP         10187563 A      7/1998

OTHER PUBLICATIONS

U.S. patent application Ser. No. 09/542,517, Related Co–Pending Application Rabindranath Dutta, filed Apr. 3, 2000.
Baker, Scott M., "SBNews: News Robot Utility," Dec. 1, 1999, pp. 1–24; online search: http://www.newsrobot.com/sbnews/newshot.html.
"Daily Personalized Electronic Delivery of Newspapers," newZPrint, Dec. 1, 1999, pp. 1–3; online search: http://www.newzprint.com.
"Press Releases," NewZPrint, Dec. 1, 1999, pp. 1–2; online search: http://www.newzprint.com/press.html.
"Technical Support," newZPrint, Dec. 1, 1999, pp. 1–5; online search: http://www.newzprint.com/techsupport.html.
Berry, Wayne, "Creating a Push Server with ASP," Oct. 31, 1997, pp. 1–9; online search: http://local.15seconds.com/issue971102.htm.
"An Exploration of Dynamic Documents," Dec. 1, 1999, pp. 1–8; online search: http://www.netscape.com/assist/net_sites/pushpull.html.
Wong, K. P., Wang, C. L., "Push–Pull Messaging: A High-Performance Communication Mechanism for Commodity SMP Clusters"; Abstract, IEEE Comput. Soc., 1999, 1 page.
Kanitkar V., Delis, A., "Real–time Clinet–Server Push Strategies: Specification and Evaluation," Abstract, IEEE Comput. Soc., 1998, 1 page.
Acharya, S., Franklin M., Zdonik, S., "Balancing Push and Pull for Data Broadcast," Abstract, Sigmond Rec. (USA), ACM, 1997, 1 page.

* cited by examiner

Primary Examiner—Meng-Al T. An
Assistant Examiner—Kenny Lin
(74) Attorney, Agent, or Firm—Marilyn Smith Dawkins; Bracewell & Patterson, L.L.P.

(57) ABSTRACT

A data processing system with efficient facilities for transmitting a serial electronic publication to subscribers includes a status manager and a push engine. The status manager associates a vacation setting with at least one subscriber among a plurality of subscribers. The push engine identifies one or more non-vacationing subscribers among the plurality of subscribers, by reference to the vacation setting, and electronically transmits issues of the publication only to the one or more non-vacationing subscribers. In an illustrative embodiment, the data processing system includes an input module that receives a message from the at least one subscriber specifying a vacation interval for putting the vacation setting in effect, the vacation interval is stored, and the push engine identifies the one or more non-vacationing subscribers by reference to the vacation interval.

10 Claims, 6 Drawing Sheets

METHOD, SYSTEM AND PROGRAM FOR EFFICIENTLY DISTRIBUTING SERIAL ELECTRONIC PUBLICATIONS

CROSS-REFERENCES TO RELATED APPLICATIONS

The present invention is related to the following application filed concurrently with this application: U.S. patent application Ser. No. 09/542517 entitled "METHOD, SYSTEM AND PROGRAM FOR EFFICIENTLY DISTRIBUTING SERIAL ELECTRONIC PUBLICATIONS" which is hereby incorporated.

BACKGROUND OF THE INVENTION

1. Technical Field

The present invention relates in general to data processing systems and, in particular, to methods and systems for distributing electronic publications to subscribers at data processing systems. Still more particularly, the present invention relates to methods, systems and programs for optimizing the efficiency with which serial electronic publications are distributed to subscribers.

2. Description of the Related Art

Not long ago, magazines, newspapers, technical bulletins, and other serial publications were distributed almost exclusively in hardcopy, paper format. In recent years, however, the Internet and smaller computer networks have attained unprecedented popularity and ubiquity, making it easier than ever before to link widespread communities of individuals with common interests. Consequently, as the number of Internet users has grown, so has the utilization of electronic publications. For example, Dow Jones & Company, Inc. now offers subscriptions to the traditional, paper format of THE WALL STREET JOURNAL®, as well as subscriptions to an electronic format that is delivered to subscribers electronically via network connections. Among the advantages available to electronic publications, relative to hardcopy publications, are increased ease and rapidity of delivery from the publisher to the subscriber and support for multimedia content (such as audio, animation, etc.).

Currently, the most commonly utilized network architecture, and the architecture utilized by the Internet, is the client/server architecture. Within computer networks utilizing that architecture, electronic publications are typically distributed or published (i.e., transmitted) utilizing either a "client pull" or a "server push" technique. In either case, the publication is transmitted from a server data processing system to subscribers at client data processing systems. However, with client pull, the clients initiate the download of each issue, whereas in server push, the server does the initiating (after the clients have provided permission for the server to write to their storage).

Client pull may be utilized when a subscriber is unable to provide a publisher with a persistent network address for receiving each issue of a publication. For the purposes of this document, a network address is persistent if it is always associated with the same subscriber and substantially always receptive. For example, individuals who connect to the Internet through dial-up connections to Internet Service Providers (ISPs) generally do not maintain permanent connections and do not obtain the same Internet Protocol (IP) addresses each time they establish dial-up connections. Nevertheless, once a dial-up subscriber has established a non-persistent (or "temporary") connection, client pull allows that subscriber to download issues of publications, utilizing the network address associated with that temporary connection.

Currently, dial-up connections are the most widely utilized mechanism for connecting clients to the Internet. However, the number of individuals with persistent network addresses is on the increase, as cable modems, direct T1 lines, and similar technologies appear to be gradually replacing dial-up connections as the connection mechanism of choice for Internet users.

When a subscriber is able to provide a publisher with a persistent network address, server push may be utilized to transmit issues. For example, subscribers who maintain permanent Internet connections via cable modems, direct T1 lines, and the like are able to provide persistent network addresses when subscribing to publications. In addition, efforts are currently under way to develop network protocols that support server push to subscribers without persistent network addresses, such as traveling subscribers who connect to the Internet via wireless services.

Push techniques may also be utilized to push content from a publishing server to one or more intermediate servers, in anticipation of dial-up subscribers opening temporary connections to those intermediate servers. The content is subsequently downloaded from an intermediate server by a dial-up subscriber, for example automatically when the subscriber connects to the network, in response to operator input initiating the download, or in response to some other event indicating that the client data processing system is ready to receive the content. For example, serials can be distributed from a publishing server to subscribers via Internet e-mail, with issues being pushed to e-mail servers associated with the subscribers, even though the subscribers might not be connected at that time to the network. Once the subscribers do connect to their respective e-mail servers, the e-mailed issues may be downloaded to the subscriber's client data processing systems. The download can happen automatically, according to a predetermined schedule in client software (such as an e-mail client), or in response to other conditions, such as an explicit request from a subscriber to check for new mail.

Push techniques provide a number of advantages, relative to pull techniques. For instance, when push is utilized, the load on the publishing server (or servers) may be balanced according to a publishing schedule. For example, a daily issue of a publication may be ready for distribution at midnight and expected, by 80,000 subscribers, to be available at client data processing systems by 8:00 a.m. With push, the server may merely transmit the issue to 10,000 subscribers per hour to meet the distribution objectives. With pull, by contrast, if all of the clients request the issue between 7:00 and 8:00 a.m., the server must transmit the issue at a rate of at least 80,000 subscribers per hour to service all of the subscribers effectively. Also, push techniques allow publishers to distribute supplemental content, such as news flashes, to subscribers in a timely manner.

However, electronic publications in general, and pushed publications in particular, also share some disadvantages with hardcopy publications, including problems with overloading a subscriber with unwanted issues of a publication. The problem of overload may occur, for example, when a subscriber is too busy to read all of the issues of publications that are being delivered, or when the subscriber is on vacation, for instance, and issues are accumulating unread on the subscriber's data processing system.

Consequently, what is needed is a way to reduce or eliminate the inefficiencies associated with transmitting unwanted issues of a publication and storing those issues in a client or in an intermediate server. In addition, it would be advantageous to manage the publication process so as to prevent unwanted issues from being presented to the subscriber, thereby freeing the subscriber from the task of manually sorting through a number of issues to distinguish the wanted from the unwanted and purging the latter.

SUMMARY OF THE INVENTION

According to the present invention, a data processing system with facilities for efficiently transmitting a serial electronic publication to subscribers includes a status manager and a push engine. The status manager associates a vacation setting with at least one subscriber among a plurality of subscribers. The push engine identifies one or more non-vacationing subscribers among the plurality of subscribers, by reference to the vacation setting, and electronically transmits issues of the publication only to the non-vacationing subscribers. In an illustrative embodiment, the data processing system also includes an input module that receives a message from the at least one subscriber specifying a vacation interval for putting the vacation setting in effect. The vacation interval is then stored, and the push engine identifies the one or more non-vacationing subscribers by reference to the vacation interval.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
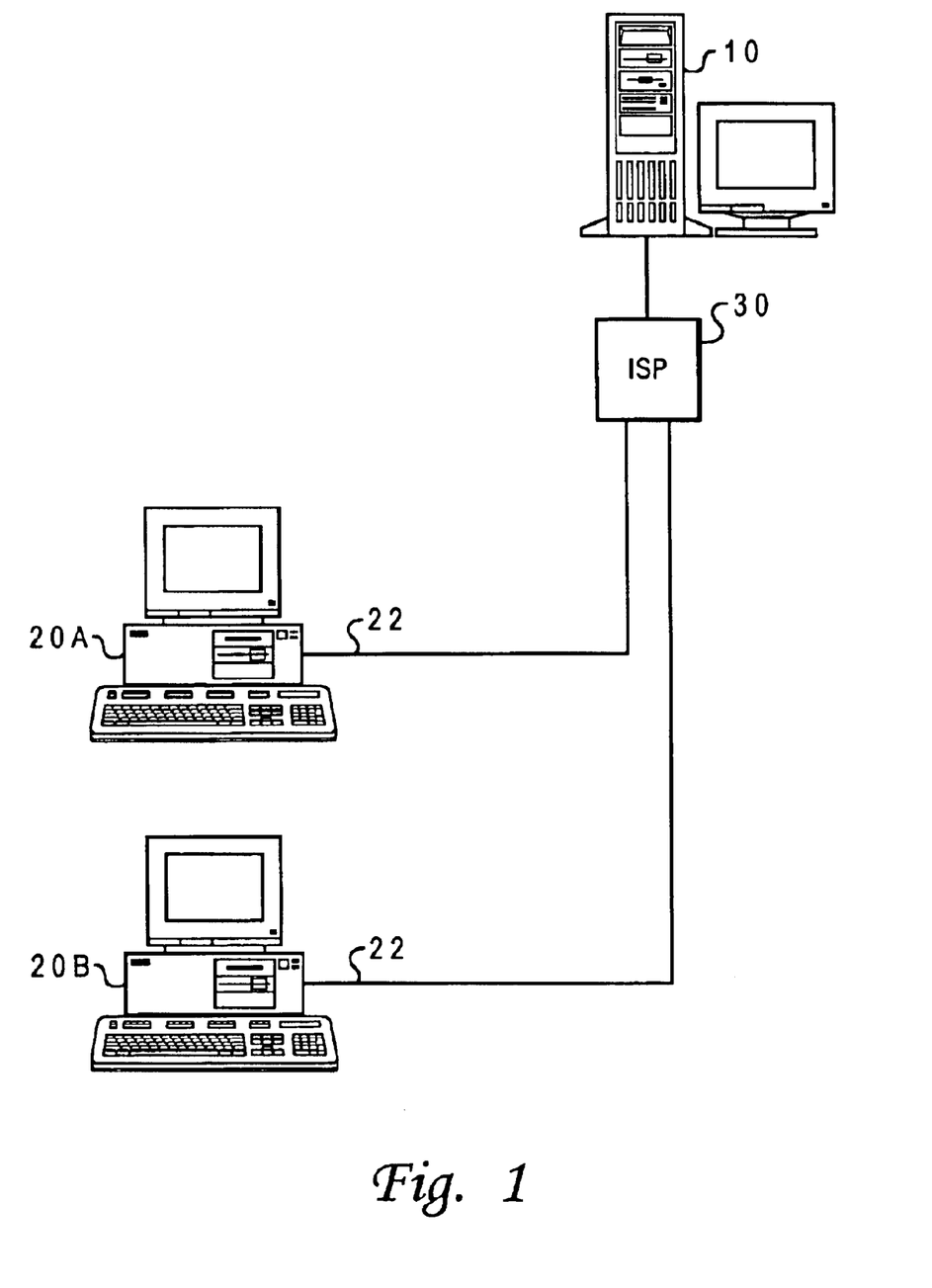
FIG. 1 depicts an illustrative embodiment of a data processing system network within which the method, system and program of the present invention may advantageously be utilized.

With reference now to the figures and in particular with reference to FIG. 1, there is depicted an illustrative network of data processing systems including a server machine 10 and two client machines 20A and 20B. Clients 20A and 20B are connected to server 10 via communications media 22 (such as twisted-pair cables, coaxial cables, telephone lines, microwave links, and/or radio links). The network may also include one or more intermediate data processing systems, such as an Internet service provider ("ISP") 30.

Figure 2:
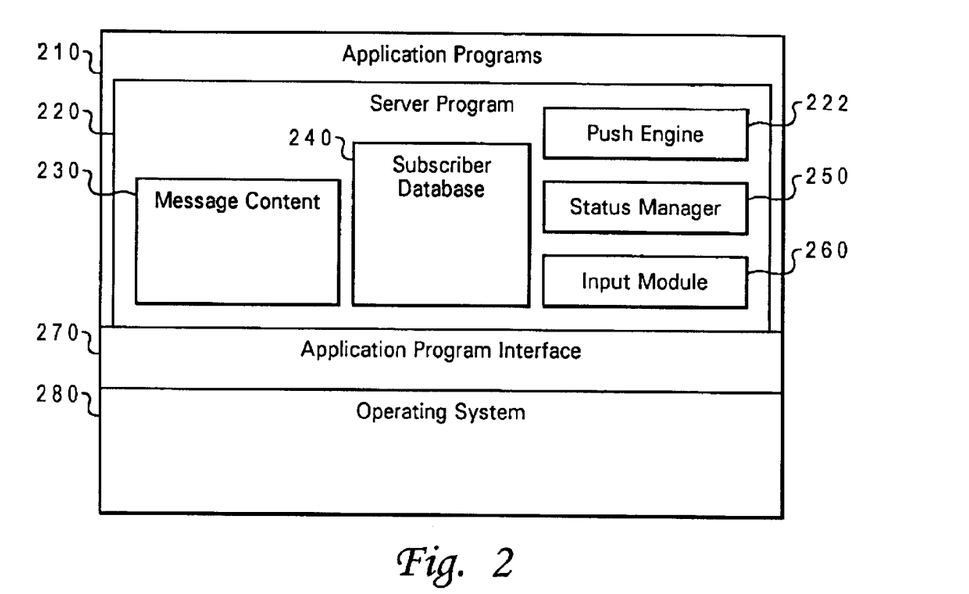
FIG. 2 illustrates a layer diagram of exemplary server software for transmitting a serial electronic publication to subscribers efficiently, in accordance with the present invention.

Referring now to FIG. 2, there is illustrated a layer diagram of exemplary software within server 10 that provides for efficient distribution of serial electronic publications, in accordance with the present invention. At the highest level of the diagram are the application programs 210, including a server program 220 that is configured to use server push to transmit issues of one or more publications from server 10 to subscribers.

As shown, server program 220 includes a push engine 222 for electronically transmitting issues of a publication to subscribers, for example according to a predetermined distribution schedule. For instance, for a daily serial publication (i.e., a serial that generates one new issue per day) push engine 222 might be programmed to initiate distribution at a certain time each day. Server program 220 also contains a message content storage area 230 for holding the data that constitutes an issue, in preparation for distributing that issue. Also included in server program 220 is a subscriber database 240 for holding data relating to the subscribers. In particular, in the illustrative embodiment, subscriber database 240 holds the network addresses of the subscribers, as well as status settings which allow the server to distribute issues according to subscriber preferences. As described below with reference to FIGS. 4, 5, and 6, server program 220 also contains a status manager 250, which alters the status settings in subscriber database 240 in response to input from subscribers. Server program 220 receives that input through an input module 260.

At the intermediate level of the software diagram is an application program interface (API) 270, through which application programs 210 request services from the operating system 280. Operating system 280, which occupies the lowest level of the diagram, is a network operating system. As such, in addition to managing the operations of server 10 (by performing duties such as resource allocation, task management, and error detection), operating system 280 also provides tools for managing communications between server 10 and remote data processing systems (such as clients 20A and 20B).

Figure 3:
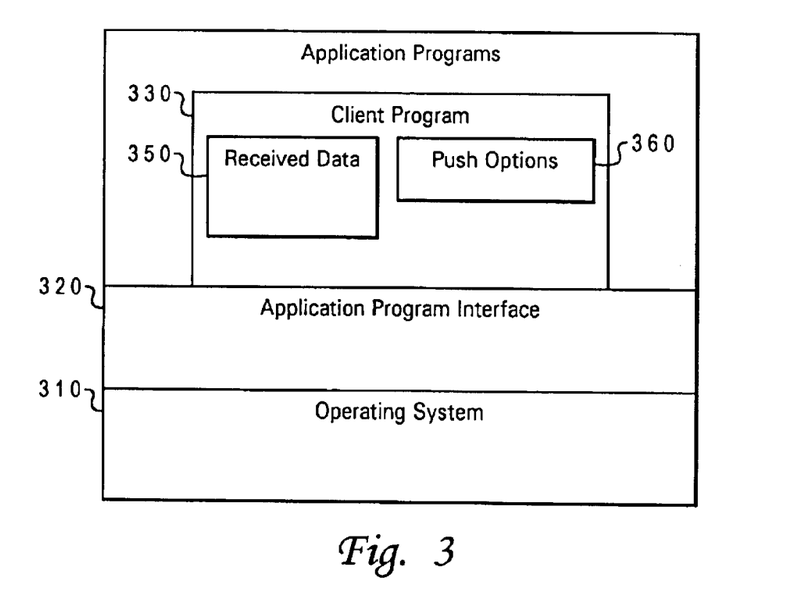
FIG. 3 depicts exemplary client software that supports efficient publication of electronic serials, in accordance with the present invention.

With reference now to FIG. 3, there is depicted exemplary software within clients 20A and 20B that cooperates with server program 220 to support efficient publication of electronic serials. As shown, in addition to an operating system 310 and an API 320, each of clients 20A and 20B includes a client program 330 for sending and receiving network communications. In particular, network program 330 includes an interface module through which communications are sent and received, and a received data storage area 350, in which received communications may be stored. In the illustrative embodiment, client program 330 also includes a list of push options 360, which includes settings for subscription preferences, as described below with reference to FIGS. 4, 5, and 6.

Publication Process

Figure 4:
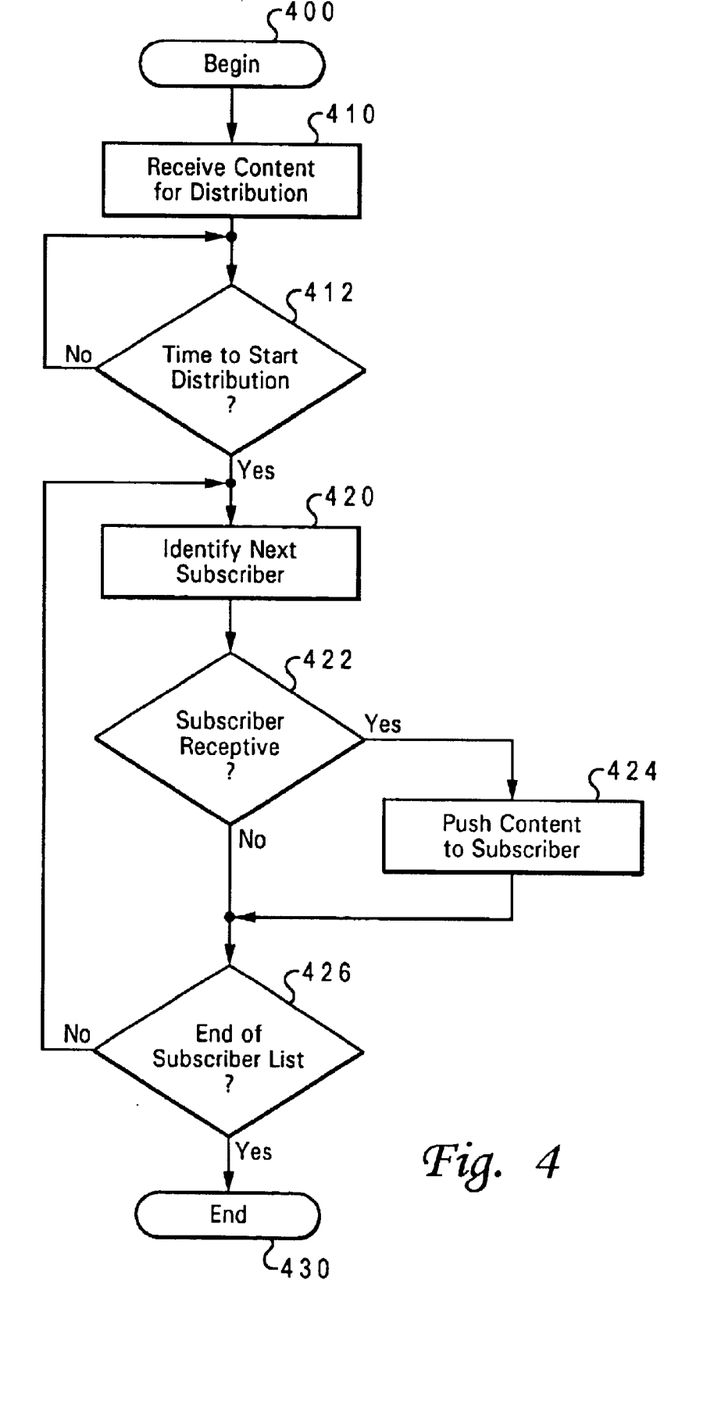
FIG. 4 illustrates an exemplary method, means and program function within a server for transmitting a serial electronic publication to subscribers efficiently, in accordance with the present invention.

Referring now to FIG. 4, there is illustrated an exemplary method, means and program function for transmitting a serial electronic publication, in accordance with the present invention. The illustrated process begins with server 10 executing server program 220, and server program 220 waiting to receive data to be transmitted as the next issue of a publication, as shown at block 400. The process then passes to block 410, which depicts server program 220 receiving the content of the new issue (for instance, from a different application running in server 10 or from a remote data processing system) and storing that content in message content storage area 230. Then, as shown at block 412, server program 220 determines whether it is time to initiate distribution. Preferably, that determination is made by comparing the current time with a scheduled time to initiate distribution, possibly in conjunction with other tests, such as a verification that new content has been received. Alternatively, publication may be initiated manually.

Once the initiation time has been reached, the process enters a main loop at block 420, which illustrates push engine 220 initiating the distribution process by consulting subscriber database 240 to identify a subscriber. As depicted in general at block 422 (and in detail in FIG. 5), a determination is then made whether the identified subscriber is receptive to new issues.

Figure 5:
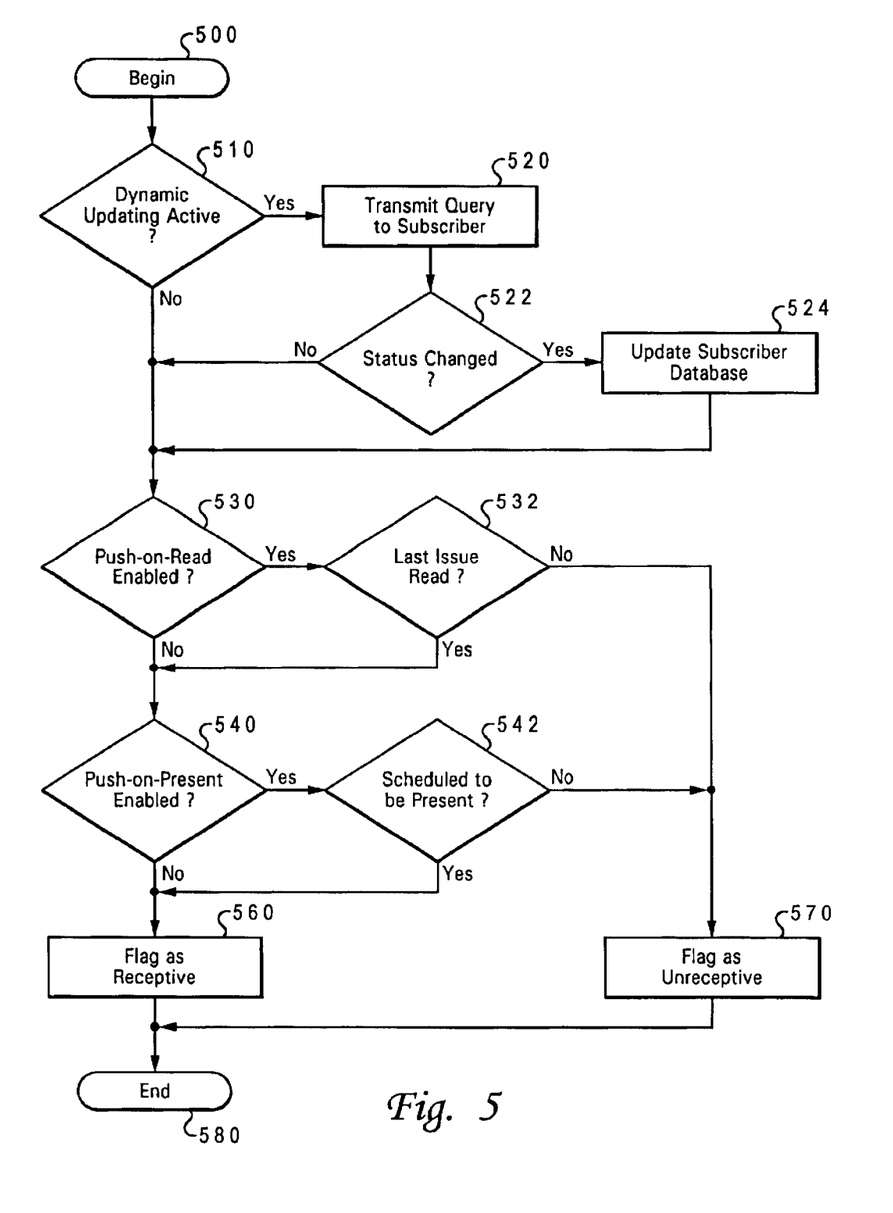
FIG. 5 illustrates in greater detail an exemplary subset of the method, means and program function of FIG. 4 for determining whether a subscriber is receptive.

In a first embodiment of the present invention, push engine 222 makes that determination based on "push-on-read" settings in subscriber database 240. Specifically, those settings identify each subscriber that has enabled push-on-read filtering and, for each such subscriber, indicate whether the last issue that he or she received has been "read" (i.e., opened) yet.

In a second embodiment, the determination depicted at block 422 is made based on "vacation" (or "push-on-present") settings in subscriber database 240. Those settings indicate whether the subscriber is expected to be present to read the new issue or, instead, is expected to be on vacation or otherwise unavailable. Specifically, the push-on-present settings identify each subscriber that has enabled push-on-present filtering and, for each such subscriber, specify zero or more time periods during which transmission is to be suspended. A third embodiment is also provided, in which both push-on-read and push-on-present settings are consulted.

Furthermore, as explained below with reference to FIG. 5, the present invention provides optional dynamic status updating for any of those three embodiments. By dynamically updating the subscriber status data, allowances are made for subscribers with unexpected changes in status, such as subscribers who return from vacation early. The dynamic updating also makes allowance for connection interruptions which might occur, for example, when server 10 is temporarily unavailable due to repairs or maintenance. Even though subscribers will be unable to register status updates (described below with reference to FIGS. 6 and 7) while server 10 is down, the dynamic updating enables server 10 to retrieve those updates from subscribers before the distribution decision pertaining to those subscribers is made.

With reference now also to FIG. 5, there is illustrated an exemplary method, means and program function for making the determination depicted in block 422 of FIG. 4, with the depicted steps providing for dynamic status updating, as well as both push-on-read and push-on-present subscriber settings. The illustrated process begins at block 500 with control having reached block 422 of FIG. 4. As illustrated at block 510, push engine 220 then determines whether dynamic status updating is configured to be active. Depending on factors affecting a particular installation, such updating may be configured by an administrator of server 10 to be active or not on a per-subscription basis, or on a server level for all subscribers to all subscriptions. Alternatively, subscribers to one or more subscriptions may be given the ability to activate such updating on an individual (per-subscriber) basis.

If push engine 220 determines that dynamic status updating is active, status manager 250 transmits a status query to the identified subscriber, as illustrated at block 520. If input module 260 receives a corresponding status response from the subscriber indicating that the status settings should be changed, the process flows through block 522 to block 524, which shows status manager 250 updating subscriber database 240 accordingly.

After subscriber database 240 has been updated, or if it is determined at blocks 510 or 522, respectively, that dynamic status updating is inactive or that no status update is necessary, the process passes to block 530. As depicted at block 530, server program 220 then determines whether push-on-read filtering is enabled for the identified subscriber. If so, the process passes to block 532, which shows server program 220 determining, by reference to subscriber database 240, whether the copy of the last issue that was transmitted to the identified subscriber has been opened. If that copy has not yet been opened, the identified subscriber is flagged as unreceptive, as shown at block 570.

However, if it is determined at blocks 530 or 532, respectively, that push-on-read filtering is not enabled or that the last issue has been opened, server program 220 next determines whether push-on-present filtering is enabled, as depicted at block 540. If so, server program 220 determines whether subscriber database 240 includes a vacation setting for the identified subscriber that matches the publication time for the new issue, as illustrated at block 542. If the subscriber has set a vacation interval covering that publication time, the subscriber is flagged as unreceptive, as depicted at block 570. For example, as described below with reference to FIG. 6, a subscriber may notify server 10 that vacation filtering is to be enabled and that the subscriber should be considered present on all days except for March 1 through March 8. As a result, server program 220 would flag that subscriber as unreceptive when issues are being distributed for March 1 through March 8. However, if server program 220 determines that the subscriber is scheduled to be present for a current issue or that push-on-present is not enabled, the subscriber is flagged as receptive, as illustrated at block 560.

Once the subscriber has been flagged as either receptive or unreceptive, the process passes from block 560 or 570, respectively, through block 580 to return to block 422 of FIG. 4. If the subscriber has been flagged as receptive, the process then passes to block 424, which shows push engine 222 transmitting the latest issue to the subscriber, and then to block 426. If the subscriber is flagged as unreceptive, however, block 424 is bypassed and the process passes directly from block 422 to block 426.

As illustrated at block 426, server program 220 then determines whether subscriber database 240 lists any remaining unprocessed subscribers. If there are one or more additional subscribers to handle, the process then returns to the top of the main loop at block 420, and a next subscriber is identified and processed, as described above. Finally, once the last subscriber has been processed, the illustrated process ends, as shown at block 430.

Push-on-Read Client Process

Figure 6:
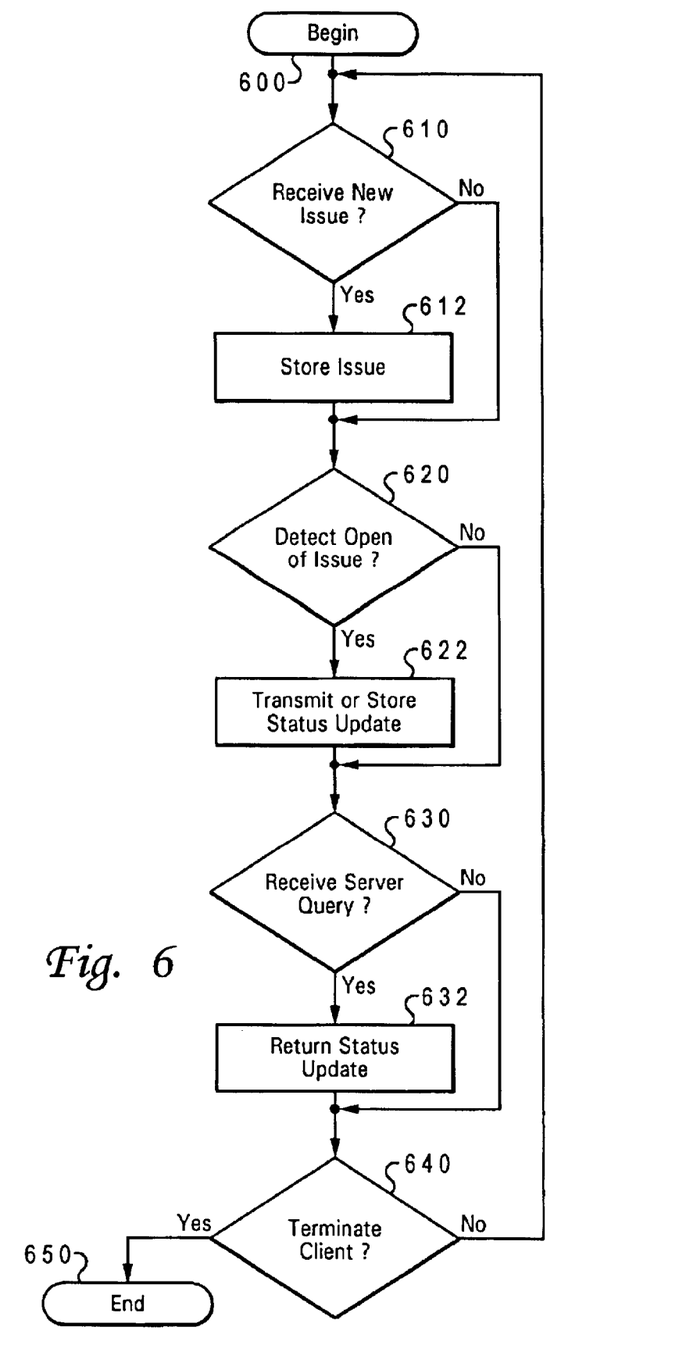
FIG. 6 depicts an exemplary method, means and program function within a client for preventing issues of an electronic publication from accumulating at a client data processing system while one or more earlier issues remain unopened, in accordance with the present invention.

Referring now to FIG. 6, there is depicted an exemplary method, means and program function within client 20A for receiving issues and responding to dynamic requests from server 10 for status updates, according to the push-on-read methodology. The depicted process begins at block 600 with client program 330 executing in client 20A, with the network address of client 20A having been registered as the address of a subscriber to a serial publication, and with the push-on-read filter enabled for that subscriber.

The process then passes to block 610, which illustrates client program 330 determining whether a new issue of a publication has been received. If a new issue has been received, client program 330 saves the received issue in received data storage area 350, as shown at block 612. After the issue is saved, or if it is determined that no new issue has been received, the process passes to block 620, which depicts client program 330 determining whether the saved copy of the new issue has been opened for the first time. If so, client program 330 transmits a status update to server 10 indicating that the issue has been opened.

In the illustrative embodiment, a Web browser is utilized to view issues, and server 10 packages a hypertext transfer protocol (HTTP) "cookie" with each issue sent to subscribers that have enabled push-on-read filtering. Accordingly, the mechanism used for the status update is the corresponding cookie response that the web browser automatically returns to server 10 when the issue is opened. Alternatively, however, client program 330 could be configured to identify subscribers who have opened an issue by transmitting status updates as HTTP functions (such as "PUT" or "POST") for storing data on server 10 or by sending e-mail to an address that server 10 has added to an HTTP header associated with the new issue (for example, in the FROM field of the HTTP header). In any case, however, if client program 330 is unable to successfully transmit the status update to server 10, client program 330 preferably stores the new settings locally in push options storage area 360.

Once the status update has been transmitted or stored, the process passes from block 622 to block 630, which illustrates client program 330 determining whether a server query has been received. If so, as depicted at block 632, client program 330 returns a status update based on the subscriber's current status, as reflected in push options storage area 360. That status update indicates the changes to the subscriber status that have occurred, if any, since the last time client program 330 successfully transmitted an update to server 10. Thus, correct status is maintain at server 10 in time for distribution.

After the status update is transmitted, or after it is determined that no server query has been received, the process passes to block 640, which depicts a determination of whether an operator of client 20A has requested termination of client program 330, for instance by instructing client 20A to shut down. If termination has been requested the process ends, as shown at block 650. Otherwise, the process returns to block 610 and the steps described above are repeated, beginning with a determination of whether a new issue has been received. Client program 330 thus prevents server 10 from pushing a new issue to the subscriber until the last issue that was received by the subscriber has been opened or read.

Push-on-Present Client Process

Figure 7:
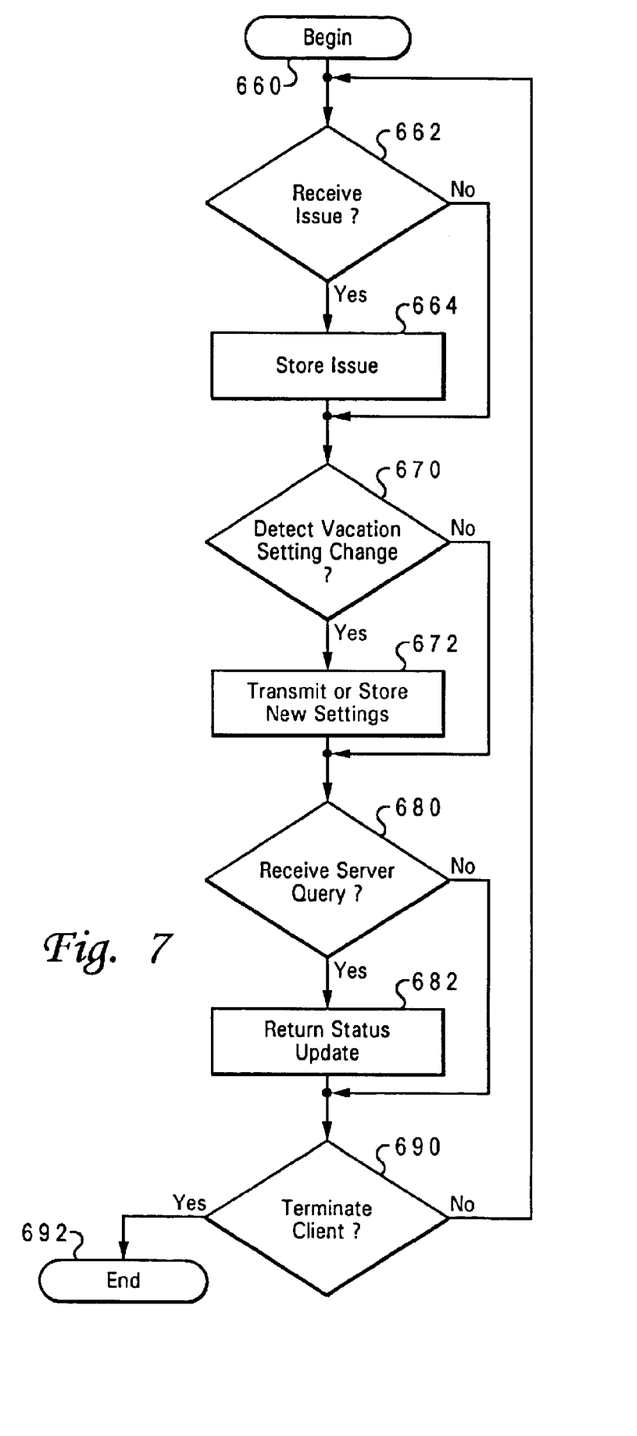
FIG. 7 illustrates an exemplary method, means and program function within a client for temporarily suspending delivery of an electronic publication, in accordance with the present invention.

With reference now to FIG. 7, there is illustrated an exemplary method, means and program function within client 20B for receiving issues and responding to dynamic requests from server 10 for status updates, according to the push-on-present methodology. The illustrated process begins at block 700 with client program 330 executing in client 20B, with the network address of client 20B having been registered as the address of a subscriber to a serial publication, and with the push-on-present filter enabled for that subscriber.

The process then passes to block 662, which depicts client program 330 determining whether a new issue of a publi-cation has been received. If a new issue has been received, client program 330 saves the received issue in received data storage area 350, as shown at block 664. After the issue is saved, or if it is determined that no new issue has been received, the process passes to block 670, which depicts client program 330 determining whether the subscriber has provided input indicating that the subscriber's vacation settings should be changed. If so, client program 330 transmits a status update to server 10 describing the requested changes, as depicted at block 672.

In the illustrative embodiment, the mechanism that conveys the status update is an HTTP function (such as "PUT" or "POST") for storing data on server 10, although those of ordinary skill in the art will recognize that alternative mechanisms might be utilized as well. In any case, however, if client program 330 is unable to successfully transmit the status update to server 10, client program 330 preferably stores the new settings locally in push options storage area 360.

Once the status update has been transmitted or stored, the process passes from block 672 to block 680, which illustrates client program 330 determining whether a server query has been received. If so, as depicted at block 682, client program 330 returns a status update indicating the changes to the subscriber status that have occurred, if any, since the last time client program 330 successfully transmitted status settings to server 10.

After the status update is transmitted, or after it is determined that no server query has been received, the process passes to block 690, which depicts a determination of whether an operator of client 20B has requested termination of client program 330, in which case the process ends, as shown at block 650. Otherwise, the process returns to block 662 and the steps described above are repeated, beginning with a determination of whether a new issue has been received. Client program 330 thus prevents server 10 from pushing new issues to the subscriber while the subscriber is scheduled to be absent.

In conclusion, as has been described, the present invention gives subscribers the ability to prevent publishers of electronic publications from transmitting unwanted issues of a publication, thereby enhancing the efficiency of the distribution process and keeping unwanted issues from accumulating on client data processing systems and/or intermediate servers. When a new issue is being distributed, a first embodiment filters out certain subscribers who have not opened a previous issue of that subscription. A second embodiment filters out subscribers according to individual "vacation" settings. In addition, dynamic updating of subscriber status is provided, and filtering and dynamic updating may be activated or deactivated at the server, publication, and/or subscribers level.

While the invention has been particularly shown and described with reference to a preferred embodiment, it will be understood by those skilled in the art that various changes in form and detail may be made therein without departing from the spirit and scope of the invention. For example, those of ordinary skill in the art will recognize that, although the illustrative embodiment stores subscriber's network addresses and status settings in a single subscriber database, that database could instead be designed to identify subscribers by e-mail addresses or other types of data, and the identifiers and status settings need not necessarily be stored in the same data construct. Similar variations on the basic concepts taught herein would likewise be apparent to those of ordinary skill in the art. For example, the allocation of functions among the components of the server program and the constructs and locations utilized to store various other data items utilized in the publication process could be varied to a certain degree without substantially departing from spirit and scope of the invention as taught herein.

What is claimed is:

1. A method in a network of data processing systems for transmitting a serial electronic publication to subscribers efficiently, said method comprising:

associating a vacation setting with at least one subscriber among a plurality of subscribers to a serial electronic publication;

identifying one or more non-vacationing subscribers among said plurality of subscribers by reference to said vacation setting, wherein said vacation setting distinguishes said non-vacationing subscribers from said at least one vacationing subscriber among the plurality of subscribers;

determining that a publication time for initiating distribution of said issue has been reached;

transmitting a status request to said at least one subscriber, said status request querying said subscriber to extend said vacation setting or to remove said vacation setting;

receiving a corresponding status reply from said at least one subscriber;

identifying said at least one subscriber as a non-vacationing subscriber, in response to a determination that said status reply indicates that said vacation setting should no longer be in effect; and electronically transmitting an issue of said serial electronic publication from a server data processing system to one or more client data processing system associated, respectively, to said one or more non-vacationing subscribers in response to said identifying step, wherein said issue is transmitted as a substantially simultaneous transmission to said one or more non-vacationing subscribers, and wherein said issue is withheld from being transmitted to said at least one vacationing subscriber because of said vacation setting.

2. The method of claim 1, further comprising:

receiving, at said client data processing system, operator input specifying a vacation interval for putting said vacation setting in effect;

storing said vacation interval at said client data processing system; and building said status reply based on said vacation interval.

3. The method of claim 1, wherein:

said method further comprises:

receiving a message from said at least one subscriber specifying a vacation interval for putting said vacation setting in effect; and storing said vacation interval in a list of vacation intervals; and said step of identifying said one or more non-vacationing subscribers is performed by reference to said list of vacation intervals.

4. The method of claim 3, further comprising:

determining that a publication time for initiating distribution of said issue has been reached;

transmitting a status request to said at least one subscriber;

receiving a corresponding status reply from said at least one subscriber; and identifying said at least one subscriber as a non-vacationing subscriber, in response to a determination that said status reply indicates that said vacation setting should no longer be in effect.

5. A server data processing system with facilities for transmitting a serial electronic publication to subscribers efficiently, said server data processing system comprising:

a status manager that associates a vacation setting with at least one subscriber among a plurality of subscribers to a serial electronic publication; and a push engine that identifies one or more non-vacationing subscribers among said plurality of subscribers by reference to said vacation setting, and that electronically transmits said issue to one or more client data processing systems associated, respectively, with said one or more non-vacationing subscribers in response to said identification, wherein said issue is not transmitted to said subscribers identified with a vacation setting; and wherein said server data processing system includes a timer that indicates when a publication time for initiating distribution of an issue of said serial electronic publication has been reached;

wherein said status manager automatically transmits a status request to said at least one subscriber in response to said indication of said timer;

wherein said server data processing system includes an input module that receives a status reply from said at least one subscriber that corresponds to said status request; and wherein said status manager updates said vacation setting in according to said status reply, wherein further:

when said status reply indicates said vacation setting is no longer valid, said status manager disassociates the vacation setting from the respective subscriber; and when said status reply indicates said vacation setting is still valid, said vacation setting remains associated with the respective subscriber.

6. The data processing system of claim 5, wherein:

said server data processing system includes an input module that receives a message from said at least one subscriber specifying a vacation interval for putting said vacation setting in effect;

said server data processing system includes storage for storing said vacation interval in a list of vacation intervals; and said push engine identifies said one or more non-vacationing subscribers by reference to said list of vacation intervals.

7. The data processing system of claim 6, wherein:

said server data processing system includes a timer that indicates when a publication time for initiating distribution of an issue of said serial electronic publication has been reached;

said status manager automatically transmits a status request to said at least one subscriber in response to said indication of said timer;

said input module receives a status reply from said at least one subscriber that corresponds to said status request; and said status manager updates said vacation setting according to said status reply.

8. A program product for transmitting a serial electronic publication to subscribers efficiently, said program product comprising:

a status manager that associates a vacation setting with at least one subscriber among a plurality of subscribers to a serial electronic publication;

a push engine that identifies one or more non-vacationing subscribers among said plurality of subscribers by reference to said vacation setting, and that electronically transmits said issue from a server data processing system to one or more client data processing systems associated, respectively, with said one or more non-vacationing subscribers in response to said identification wherein said issue is not transmitted to said subscribers identified with a vacation setting;

wherein said server data processing system includes a timer that indicates when a publication time for initiating distribution of an issue of said serial electronic publication has been reached;

wherein said status manager automatically transmits a status request to said at least one subscriber in response to said indication of said timer;

wherein said status manager receives a status reply from said at least one subscriber that corresponds to said status request; and wherein said status manager updates said vacation setting in according to said status reply, wherein further:

when said status reply indicates said vacation setting is no longer valid, said status manager disassociates the vacation setting from the respective subscriber; and when said status reply indicates said vacation setting is still valid, said vacation setting remains associated with the respective subscriber; and a computer usable medium encoding said status manager and said push engine.

9. The program product of claim 8, wherein:

said computer usable medium also encodes an input module that receives a message from said at least one subscriber specifying a vacation interval for putting said vacation setting in effect;

said computer usable medium also encodes instructions for allocating storage in said server data processing system for storing said vacation interval in a list of vacation intervals; and said push engine identifies said one or more non-vacationing subscribers by reference to said list of vacation intervals.

10. The program product of claim 9, wherein:

said server data processing system includes a timer that indicates when a publication time for initiating distribution of an issue of said serial electronic publication has been reached;

said status manager automatically transmits a status request to said at least one subscriber in response to said indication of said timer;

said input module receives a status reply from said at least one subscriber that corresponds to said status request; and said status manager updates said vacation setting according to said status reply.

* * * * *